(12) United States Patent
Park

(10) Patent No.: US 6,703,343 B2
(45) Date of Patent: Mar. 9, 2004

(54) METHOD OF PREPARING DOPED OXIDE CATALYSTS FOR LEAN NOX EXHAUST

(75) Inventor: Paul W. Park, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 104 days.

(21) Appl. No.: 10/022,492

(22) Filed: Dec. 18, 2001

(65) Prior Publication Data

US 2003/0171216 A1 Sep. 11, 2003

(51) Int. Cl.⁷ .................................................. B01J 21/04
(52) U.S. Cl. ........................ 502/355; 502/352; 502/320; 502/335; 502/336
(58) Field of Search ................................ 502/355, 352, 502/310, 314, 315, 316, 320, 322, 324, 327, 331, 335, 348, 336

(56) References Cited

U.S. PATENT DOCUMENTS

| 6,087,295 | A | 7/2000 | Kharas et al. |
| 6,103,207 | A | 8/2000 | Chattha et al. |
| 6,165,430 | A | 12/2000 | Kudla et al. |
| 6,172,000 | B1 | 1/2001 | Chattha et al. |
| 6,232,253 | B1 | 5/2001 | Narula et al. |

OTHER PUBLICATIONS

Lean–NOx & Plasma Catalysis Over γ–Alumina for Heavy Duty Diesel Applications 2001–01–3569 Copyright 2001 Society of Automotive Engineers, Inc. no month.

*Primary Examiner*—Stanley S. Silverman
*Assistant Examiner*—Edward M. Johnson

(57) ABSTRACT

The lean NOx catalyst includes a substrate, an oxide support material, preferably γ-alumina deposited on the substrate and a metal or metal oxide promoter or dopant introduced into the oxide support material. The metal promoters or dopants are selected from the group consisting of indium, gallium, tin, silver, germanium, gold, nickel, cobalt, copper, iron, manganese, molybdenum, chromium cerium, and vanadium, and oxides thereof, and any combinations thereof. The γ-alumina preferably has a pore volume of from about 0.5 to about 2.0 cc/g; a surface area of between 80 and 350 m²/g; an average pore size diameter of between about 3 to 30 nm; and an impurity level of less than or equal to about 0.2 weight percent. In a preferred embodiment the γ-alumina is prepared by a sol-gel method, with the metal doping of the γ-alumina preferably accomplished using an incipient wetness impregnation technique.

29 Claims, 8 Drawing Sheets

Fig-3-
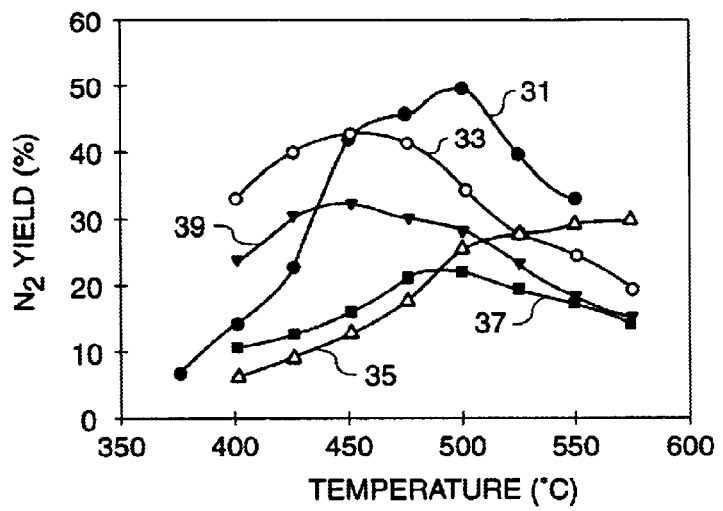
Fig-4-
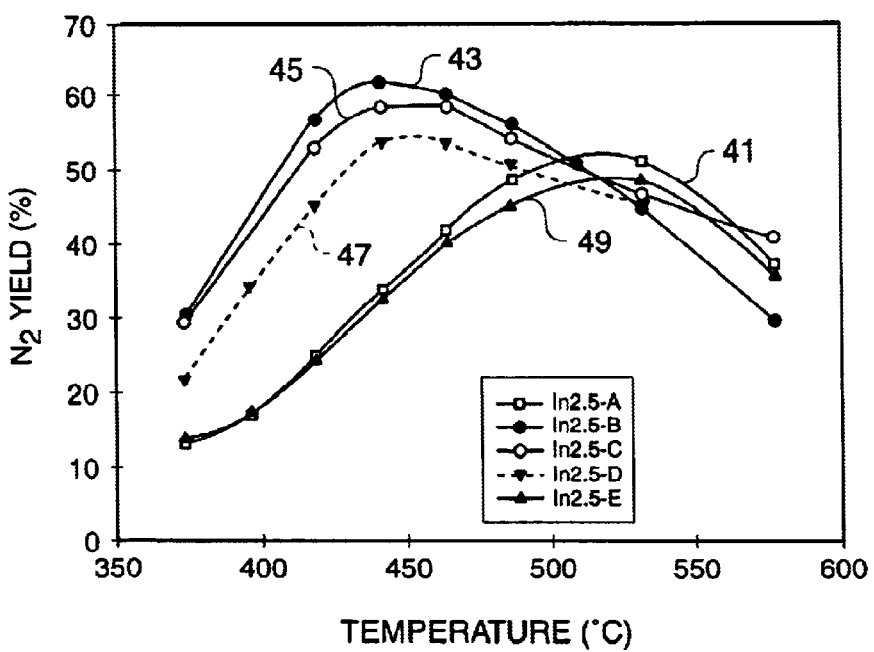

METHOD OF PREPARING DOPED OXIDE CATALYSTS FOR LEAN NOX EXHAUST

Description

This invention was made with Government support under CRADA Number PNNL-157 between Caterpillar and Battelle as operator of Pacific Northwest national Laboratory under its U.S. Department of Energy contract. To that end, the United States Government may have certain rights to this invention.

TECHNICAL FIELD

This invention relates generally to a lean NOx catalyst system for treatment of diesel engine exhaust to reduce nitrogen oxide ($NO_x$) emissions and more specifically to a metal doped oxide catalyst having high deNOx selectivity for $NO_x$ reduction and a method for preparing the metal or metal oxide doped oxide catalyst. The preferred oxide support material is γ-alumina.

BACKGROUND

Due to primarily federal regulations, engine manufacturers are being forced to reduce the amount of harmful compounds in the combustion exhaust, including a reduction in nitrogen oxides or NOx. To effectively reduce the NOx concentrations in the exhaust stream of lean burning engines including diesel and certain spark ignited engines, the use of selective catalytic reduction of NOx with a hydrocarbon in oxygen rich conditions (lean NOx catalyst systems) is actively being pursued.

Unfortunately, many catalysts or catalytic systems that have been utilized for lean burn engines to date suffer from low removal of NOx, inadequate catalyst durability, low thermal stability and a limited temperature window of operation. For example most commercially available lean NOx catalytic systems for lean burn engines only achieve less than 20% NOx reduction as a passive system and possibly up to 40% for active systems (i.e. when supplemental hydrocarbon reductant is introduced into the exhaust stream). In addition, most commercially available lean NOx catalytic systems also are subjected to sulfur poisoning, from the minimal amounts of sulfur found in many fuels and lubricants, resulting in low catalyst durability.

Such active catalytic systems involving lean NOx catalysts require a sufficient concentration of hydrocarbon (HC) species to be present. In other words, in combustion exhaust purification systems having an oxygen environment above 4% concentration, some type of reducing agent, usually a hydrocarbon compound such as diesel fuel, must be introduced into the exhaust in order to achieve acceptable reduction levels of NOx compounds. However, such introduction of fuel tends to reduce the overall fuel efficiency of the engine system.

Among metal oxide materials, alumina has been known as a durable material as well as a promising catalyst for lean-NOx reactions at high temperature. Various prior art disclosures have reported that alumina showed high deNOx performance vis-à-vis $NO_2$, particularly when oxygenated hydrocarbons were present in the exhaust gas stream. However, exhaust gas streams from most diesel engines also include NO constituent that must be readily converted.

What is needed therefore, is a lean NOx catalyst that has good selectivity of both NO and $NO_2$ in order to achieve both an improvement in the reduction of NOx from the engine exhaust stream with minimal fuel efficiency impact on the overall engine system. The presently disclosed catalyst is directed to overcome the problems as set forth above.

DISCLOSURE OF THE INVENTION

In one aspect, the disclosed invention is a method of making lean NOx catalyst. The disclosed method comprises the steps of: preparing a substrate; preparing a γ-alumina catalyst support material using a sol-gel process; doping metal promoters into the γ-alumina support material; and applying the metal doped γ-alumina support material to the substrate. The preparation of the γ-alumina support material by the sol-gel process is closely controlled to thereby controlling the γ-alumina support material physical properties including average pore size, pore volume, surface area, acidity, and impurity level.

In another aspect, the disclosed invention is a method of making a γ-alumina lean NOx catalyst comprising the steps of: dissolving an aluminum based precursor in a complexing agent to form an aluminum based solution; gelating the aluminum based solution to yield aluminum hydroxide; washing the aluminum hydroxide with water or an organic solvent; aging the aluminum hydroxide; drying the aluminum hydroxide; calcinating the aluminum hydroxide to form γ-alumina catalyst support material. Subsequent steps involve doping metal promoters selected from the group consisting of indium, gallium, tin, silver, germanium, gold, nickel, cobalt, copper, iron, manganese, molybdenum, chromium, cerium, vanadium, oxides thereof, and combinations thereof into the γ-alumina catalyst support material; and applying the metal doped γ-alumina catalyst to a ceramic substrate.

BRIEF DESCRIPTION OF THE DRAWINGS

The above and other aspects, features and advantages of the present lean NOx catalyst will be more apparent from the following more particular description thereof, presented in conjunction with the following drawings, wherein:

FIG. 3 shows the reduction of $NO_2$ to $N_2$ over various aged alumina samples identical to those in FIGS. 1 and 2;

FIG. 4 shows the reduction of NO to $N_2$ over 2.5% indium doped alumina catalyst samples made using various preparation techniques;

Figure 1:
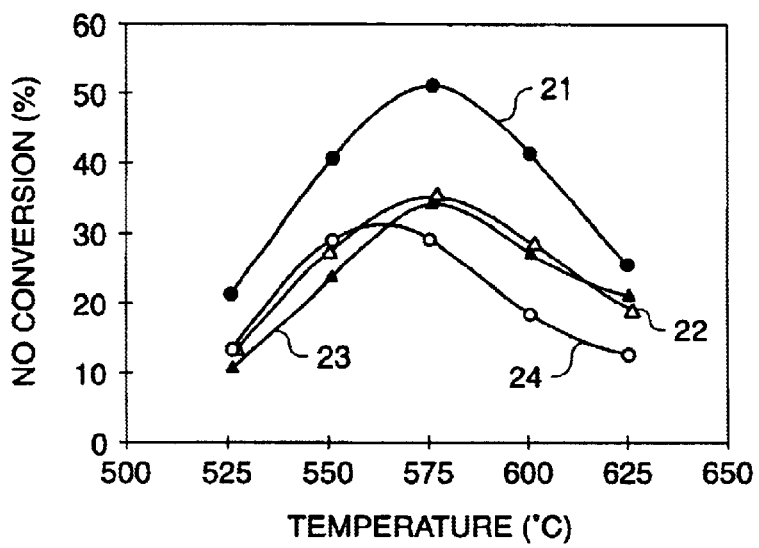
FIG. 1 shows the reduction of NO to $N_2$ over various non-aged alumina samples.

The following description is of the best mode presently contemplated for carrying out the invention. This description is not to be taken in a limiting sense but is made merely for the purpose of describing the general principals of the invention. The scope and breadth of the invention should be determined with reference to the claims.

In the present embodiment of the metal doped oxide catalyst for lean NOx diesel engine aftertreatment systems, a ceramic substrate is prepared by coating the same with an oxide support material. The substrate is preferably a ceramic honeycomb or metallic substrate, the composition of which is preferably selected from the group consisting of cordierite, alumina, titania, and FeCr alloy, although other suitable substrates can also be used.

Preferably, the oxide support material is an alumina, but alternate oxide support materials may also be considered, including aluminophosphates, hexaluminates, aluminosilicates, zirconates, titanosilicates, and titanates. Still further, it is even more preferred that γ-alumina support material be utilized for optimized deNOx performance of the lean NOx catalyst. As described herein, preparation of the washcoat oxide material is preferably accomplished using techniques such as various sol-gel processes so as to precisely control the physical and chemical characteristics of the oxide support material, including the characteristics of pore size, pore volume, surface area, concentration of impurities and thermal stabilizers. Conventional precipitation techniques can be used to prepare the desired γ-alumina if one or more of the aforementioned characteristics are met. The oxide support material is then applied to the substrate or monolith in a manner to achieve a uniform catalyst coating on such substrate or monolith. The oxide coated substrate undergoes controlled calcination to remove many unwanted and volatile components.

Next, various metal or metal oxide promoters are introduced or doped into the oxide coated substrates. The active ingredient (i.e. metal/metal oxide promoters) loading and metal/metal oxide dispersion, or metal species particle size are also precisely controlled for optimized deNOx performance of the lean NOx catalyst and to optimize other catalyst performance characteristics such as sulfur tolerance (i.e. resistance to sulfur poisoning) and temperature based performance. The preferred metal promoters include indium, gallium, tin, silver, germanium, gold, nickel, cobalt, copper, iron, manganese, molybdenum, chromium, cerium, vanadium, and the oxides thereof, and combinations thereof. More preferably the use of metal promoters indium, gallium, silver and tin (or the oxides thereof) and combinations thereof have resulted in good overall catalyst performance, including deNOx performance.

Although the lean-NOx catalytic reaction is a complex process comprising many steps, one of reaction mechanisms for alumina-based catalysts can be summarized as follows:

$$NO + O_2 \rightarrow NOx \tag{1}$$

$$HC + O_2 \rightarrow \text{oxygenated HC} \tag{2}$$

$$NOx + \text{oxygenated HC} + O_2 \rightarrow N_2 + CO_2 + H_2O \tag{3}$$

Since alumina has been known to activate the NOx reduction step summarized in equation (3), many embodiments disclosed herein focus on novel alumina materials that more readily catalyze the reaction of both NO and $NO_2$ with oxygenated hydrocarbons as well as demonstrate improved thermal stability, and therefore improve the overall deNOx performance of the lean NOx catalyst. The presently disclosed embodiments and examples demonstrate that the physical and chemical properties of an alumina, or other oxide based catalyst material, determine its' overall catalytic performance, including both deNOx performance as well as sulfur tolerance and temperature based performance.

Formation of Oxide Support Material by a Sol-gel Process

It has been found that oxide catalyst formed by a sol-gel method produces an oxide support material having unique properties for utilization in lean NOx catalytic treatment of oxygen rich exhaust. Various methods of forming the oxide support materials were investigated. In one embodiment, γ-alumina was prepared by a complexing agent assisted, sol-gel method. Another embodiment had the γ-alumina support material prepared by sol-gel method without the use of a complexing agent.

In the complexing agent assisted, sol-gel method aluminum isopropoxide (AIP) (98+%, Aldrich Chemical Company, Inc.) was dissolved in 2-methyl-2,4-pentanediol (MPD) (99% Aldrich Chemical Company, Inc.). First, 500 g AIP was placed in a 2-liter glass beaker and then 600 milliliters of MPD was added immediately and the mixture was stirred vigorously with a mechanical polyethylene stirrer. Once the mixture was homogeneous, the beaker was placed in a constant temperature bath at a range of from 110 to 130° C. and stirred continuously. After approximately 1 hour of stirring, all of the AIP was dissolved in the MPD. As the AIP reacts with the MPD, it produces 2-propanol which is released as a vapor at these temperatures. Gelation was completed after approximately 4 hours of reaction. Then 400 milliliters of water were added to stop the gelation and a white precipitate of aluminum hydroxide was obtained. The aluminum hydroxide solid was redispersed in water and aged at a temperature of from 60 to 90° C. overnight with constant stirring.

After aging overnight, about 600 milliliters of 2-propanol was added to remove the water from the pores of the precipitate. Although 2-propanol or methanol is preferred, any organic solvent having a surface tension of approximately equal to or less than 30 mN/m will be useful. It is just necessary that the solvent have a surface tension significantly below that of water, which is approximately 72 mN/m. The resulting slurry was vacuum filtered and dried at approximately 90° C. in an oven for 48 hours.

Calcination was carried out in a temperature programmed tube furnace with 5 L/min air flowing through it. A general calcination schedule is as follows: ramp the temperature from 100° C. to 700° C. at about 1° C./min; maintain at 700° C. for a prescribed time; and turn off the heat and continue flowing air over the alumina until the temperature is reduced to 100° C. During calcinations, a selected amount of water (e.g. between about 2% and 6% or more) can be added to partially sinter the powders.

This sol-gel procedure can be controlled so as to yield γ-alumina ($Al_2O_3$) with pre-aging surface areas greater than approximately 200 $m^2$/g; pre-aging pore volumes of between about 1.0 to 2.0 cc/g, and pre-aging pore sizes averaging of between about 4 to 20 nm. Specifically, one such sample, designated in Table 3 as γ-alumina, Sample B-1, has a pre-aging surface area of about 230$m^2$/g, a pre-aging pore volume of about 1.1 cc/g, and a pre-aging average pore size of about 14 nm.

Transmission Electron Microscopy (TEM) images of the γ-alumina prepared using the sol-gel technique revealed a needle-shape morphology of the γ-alumina. The γ-alumina needle morphology observed had relatively short and rounded features. On average, the needle size was about 10 nm wide and 20–50 nm long. In addition, these particles were polycrystalline according X-ray diffraction patterns. These features are a result of the γ-alumina having been prepared using the complexing agent MPD. The MPD is considered a strong complexing agent that results in short-rounded alumina particles.

As indicated above, alternate embodiments of γ-alumina were prepared using a sol-gel method without using a complexing agent. The procedure was to prepare a white slurry consisting of amorphous aluminum hydroxide by mixing aluminum isoproproxide with an excess of hot water at approximately 80° C. under vigorous stirring conditions. Approximately one-third of the white slurry was washed with water and this sample is designated in various Tables as γ-alumina, sample A-7.

Another one-third of the slurry was washed with 2-propanol. This alumina sample is designated in the various Tables as γ-alumina, sample A-2. Washing with 2-propanol provided a different surface tension on the γ-alumina during the drying step. Specifically, because the surface tension of 2-propanol is smaller than water, γ-alumina, sample A-2 maintains its open pore structure resulting in a material containing a higher surface area, larger pore volume and larger average pore size compared to the water-washed sample γ-alumina, sample A-7.

To the final one-third of the white slurry a small amount of nitric acid was added for peptization of the aluminum hydroxide to a clear sol. The clear sol solution was subsequently mixed with about 500 milliliters of water. The re-dispersed sol solution was aged overnight at approximately 85° C. A glassy crystalline material was obtained. This sample is designated γ-alumina, sample A-5 in the various data Tables included herein. This sample exhibited the smallest pore volume and the smallest pore size.

All of the alumina samples prepared according to the present invention were dried at approximately 90° C. overnight and calcined in a temperature-programmed furnace with a flowing air atmosphere. The furnace temperature was increased up to 700° C. at a ramp rate of 1° C./min and held at 700° C. for about 2 hours.

Formation of Metal Doped γ-alumina

The metal doping of the alumina or oxide support material can be preferably accomplished in one of two ways. In one method, the subject metal dopant is solubilized in the water that is used to stop gelation during the sol-gel procedure described above.

In a second method, the calcined sol-gel γ-alumina is doped with a metal by an incipient wetness impregnation method. In the preferred incipient wetness impregnation method, the calcined powder sol-gel prepared γ-alumina is brought into contact with a solution of the appropriate metal. The solution of the metal is present in an amount equal to or greater than the total pore volume of the γ-alumina sample. The pore volume of γ-alumina prepared is preferably between about 0.5 and about 2.0 cc/g of alumina.

As is discussed below, indium or indium oxide doped aluminas were prepared using both methods to investigate and understand the active sites of indium oxide and the dependence of indium particle sizes. To form an indium or indium oxide doped γ-alumina by the incipient wetness method an appropriate amount of $In(NO_3)_3$ (or $InCL_3$) was dissolved in a water solution and brought into contact with the sol-gel γ-alumina. The indium or indium oxide doped γ-alumina catalyst was then calcined at 600° C. for about 5 hours. Indium or indium oxide loading of γ-alumina catalyst is preferably in the range of between about 1 weight percent and about 10 weight percent, with a more preferable indium or indium oxide loading percentage being approximately 2.5 weight percent.

Tin or tin oxide doped γ-alumina was prepared in the same manner using $SnCl_3$ in an ethanol solution instead of water. The tin or tin oxide doped γ-alumina catalyst was calcined at 600° C. for about 5 hours and then at 800°C. for about 2 hours. As discussed below, tin or tin oxide loading of γ-alumina catalyst is preferably in the range of between about 1 weight percent and 20 weight percent, with a more preferable tin or tin oxide loading being 10 weight percent.

A third promising metal promoter evaluated is gallium or gallium oxide. A gallium or gallium oxide doped γ-alumina was prepared by exposing the γ-alumina to a water solution of $Ga(NO_3)_3$ $H_2O$ which was added to the aluminum oxide gel during the γ-alumina preparation in the sol-gel method. The gallium or gallium oxide doped γ-alumina catalyst was calcined at 600° C. for about 5 hours to form oxides of gallium loaded alumina. Gallium or gallium oxide loading of the γ-alumina catalyst is preferably in the range of between about 1 weight percent and about 55 weight percent, with a more preferable gallium or gallium oxide loading percentage being approximately 25 to 50 weight percent.

Catalytic DeNOx Performance Tests

The catalytic performance of the oxide based catalyst samples for NOx reduction was measured using a catalyst powder reactor bench test system. Reactor bench tests to characterize the catalytic performance of various samples were performed in a quartz micro tube reactor and tested with a feed gas of 0.1% $NO_x$, 0.1% $C_3H_6$ (propene), 9%–15% $O_2$, and 7%–10% $H_2O$ balanced with He. For selected tests 0–30 ppm $SO_2$ was included. The total gas flow rate was about 200 cc/min over 0.2 g of catalyst sample. These conditions approximately corresponded to a space velocity of 11,000–60,000 $h^{-1}$ depending on the oxide based catalyst bulk density. The reaction products were analyzed with a Hewlett-Packard 6890 gas chromatograph equipped with a 6' molecular sieve and a 6' Porapak Q column. The NOx conversion was calculated or estimated from the amount of $N_2$ produced.

Surface Area, Pore Size, and Pore Volume Measurements

The surface area, pore volume, and pore size distribution of various alumina samples were determined using a Micromeritics ASAP 2000 system. Approximately 0.2 to 2 grams of catalyst was out gassed under vacuum at 450° C. overnight prior to adsorption measurements. The surface area was determined by multipoints measurement using several relative pressures of $N_2$ to He in the range of 0.06 to 0.2 ($N_2$ surface area 0.162 $nm^2$) at 77 K.

Thermal Stability Testing

The thermal stability of a γ-alumina prepared according to the above-referenced sol-gel procedure was compared to various commercially available aluminas to determine whether its thermal stability were greater or less than these commercially available aluminas. To determine thermal stability surface area measurements for the various alumina samples were determined prior to and following hydrothermal aging tests. The aging test was performed in a 6" in diameter tube furnace set at 800° C. for 15 hours with a 10% $H_2O$/air flow at 5 L/min.

Impurity Analysis of Oxide Support Materials

The level of impurity in various alumina samples was determined using ICP analysis. The ICP analysis was performed using a Jobin Yvon 48 instrument. The alumina samples were completely digested in acid (HF) and diluted with de-ionized water. The acid solution was then injected into the plasma and the instrument scanned the samples for all the elements including sulfur.

materials for automotive three way catalysts. As shown in Table 2, these thermally stabilized aluminas generally showed poor NOx reduction performance compared to the corresponding un-stabilized samples. The negative effect of $La_2O_3$ stabilizer was noted from comparison of the γ-alumina sample prepared in accordance with the presently disclosed methods (Sample A-5) and Sumitomo BK-112L commercial alumina (Sample C-12). The physical properties of these two aluminas are comparable to each other. However, the Sumitomo BK-112L commercial alumina shows significantly lower NOx reduction activity than the γ-alumina sample prepared in accordance with the presently disclosed methods due to the presence of $La_2O_3$ in the Sumitomo BK-112L commercial alumina. The low activities of the stabilized alumina may be attributed to the fact that the alumina active sites are being blocked by these stabilizing elements making them unavailable for the lean-NOx catalytic process. Likewise, the deNox performance of W.R. Grace MI-120 commercial alumina was noticeably poorer than alumina prepared in accordance with the presently disclosed methods, as evidenced with data of Table 2.

TABLE 2

| Samples | Impurities (wt %) | | | $N_2$ Yield (%) | Surface Area ($m^2$/g) |
| | $Na_2O$ | $SO_4$ | Additives | (at 500° C.) | (New-Pre Aging) |
| --- | --- | --- | --- | --- | --- |
| γ-alumina (Sample B-1) | 0.0 | 0.0 | — | 60 | 230 |
| γ-alumina (Sample A-5) | 0.0 | 0.0 | — | 49 | 240 |
| W. R. Grace (MI-200) (Sample C-7) | 0.1 | 0.2 | — | 40 | 260 |
| W. R. Grace (MI-307HD) (Sample C-9) | 0.1 | 0.3 | — | 37 | 270 |
| W. R. Grace MI-120 (Sample C-12) | 0.2 | 0.7 | $SiO_2$ | 27 | 280 |
| Sumitomo (BK-112L) (Sample C-13) | 0.1 | — | $La_2O$ | 26 | 280 |

Thermal Stability of Oxide Support Materials

The results of the thermal stability tests are shown below in Table 1. The γ-alumina sample, prepared in accordance with the present invention, exhibited the lowest percentage change in surface area following the hydrothermal testing and showed one of the lowest percentage reductions in average pore size. The γ-alumina sample also showed the largest pore volume change, but this is believed to be due to its higher initial average pore volume. The aged γ-alumina sample still maintained the largest overall pore volume of the aged alumina samples. Thus, the γ-alumina of the present invention is thermally more stable than a number of commercial aluminas.

Effect of Impurity Content on DeNOx Performance

Some of the oxide support materials evaluated (See Table 2) did not have detectable level of impurities. It is believed that the absence of impurities is attributed to the preparation of the support materials using the above-described sol-gel process with precursors that did not contain sulfur or sodium compounds. These impurit-free alumina samples exhibited better deNOx performance independent of the surface area of the oxide support material. The enhanced deNOx performance indicates that purer alumina leads to better catalytic performance as compared to aluminas containing impurities such as sodium or sulfates. Even low levels of impurities

TABLE 1

| | Surface Area ($m^2$/g) | | | Pore Volume (cc/g) | | | Average Pore Size (nm) | | |
| Samples | New | Aged | % Change | New | Aged | % Change | New | Aged | % Change |
| --- | --- | --- | --- | --- | --- | --- | --- | --- | --- |
| Sumitomo (BK-112L) | 280 | 137 | 51.1 | 0.45 | 0.41 | 8.9 | 5 | 10.4 | 108.0 |
| W. R. Grace (MI-200) | 260 | 205 | 21.2 | 0.84 | 0.78 | 7.1 | 9 | 11.9 | 32.2 |
| W. R. Grace (MI-307HD) | 270 | 201 | 25.6 | 0.70 | 0.67 | 4.3 | 8 | 10.4 | 30.0 |
| γ-alumina (Sample B-1) | 230 | 200 | 13.0 | 1.1 | 0.94 | 14.5 | 14 | 14.2 | 1.4 |

Effect of Thermal Stabilizers on DeNOx Performance $La_2O_3$ and SiO2 are common alumina additives used to stabilize and minimize sintering at elevated temperatures. These stabilized aluminas are commonly used as support within the oxide support material can significantly affect the deNOx performance of the support material. Based on the foregoing deNOx performance data, zero or near zero impurity content is most desirable, however up to 0.2 weight percent is tolerable for some lean NOx applications.

Oxide Support Material DeNOx Performance Results

Various alumina samples were obtained from commercial suppliers including W.R. Grace, Columbia Md., USA; Sumitomo Chemical Company Limited, Niihama-shi Ehime-ken, Japan; and Condea Vista Company, Austin Tex., USA. In addition, several aluminas were prepared in accordance with the sol-gel methods described herein. The preparation process of the prepared alumina samples was precisely controlled to produce various γ-aluminas having a range of pore volumes, pore sizes, and surface areas. All of the γ-alumina samples prepared in accordance with the described processes were substantially free of impurities and thermal stability additives.

The sample designated γ-alumina (Sample B-1) was prepared by the sol-gel method with complexing agent as described above. The samples designated γ-alumina (Sample A-2) and γ-alumina (Sample A-5) was prepared by the sol-gel method without the use of a complexing agent and in a manner so as to control the range of pore volumes, pore sizes, and surface areas.

The surface area, pore volume, and average pore size of all the samples were measured using BET measurement as described above. Table 3 shows the results of the BET, and conversion of $NO_2$ to $N_2$ for the various alumina samples, which is generally indicative of overall deNox performance.

TABLE 3

| Samples | Surface Area ($m^2/g$) | Pore Volume (cc/g) | Avg Pore Size (nm) | $N_2$ Yield at 500° C. (%) |
|---|---|---|---|---|
| γ-alumina (Sample B-1) | 230 | 1.1 | 14 | 60 |
| γ-alumina (Sample A-2) | 380 | 1.8 | 14 | 53 |
| Sumitomo TA-1301E (Sample C-3) | 120 | 1.1 | 30 | 53 |
| Condea Vista Puralox (Sample C-4) | 160 | 0.68 | 15 | 51 |
| γ-alumina (Sample A-5) | 240 | 0.28 | 4 | 49 |
| γ-alumina (Sample A-6) | 250 | 0.42 | 5 | 41 |
| W. R. Grace MI-200 (Sample C-7) | 260 | 0.84 | 9 | 40 |
| Sumitomo TA-2301E (Sample C-8) | 128 | 1.1 | 28 | 39 |
| W. R. Grace MI-307 HD (Sample C-9) | 270 | 0.70 | 8 | 37 |
| W. R. Grace MI-207 (Sample C-10) | 350 | 1.2 | 10 | 32 |
| W. R. Grace MI-307 (Sample C-11) | 170 | 0.77 | 14 | 27 |
| W. R. Grace MI-120 (Sample C-12) | 280 | 0.92 | 10 | 27 |
| BK-112L (Sample C-13) | 280 | 0.45 | 5 | 26 |
| Sumitomo BK-112 (Sample C-14) | 320 | 0.2 | 3 | 23 |
| W. R. Grace MI-386 (Sample C-15) | 130 | 0.71 | 17 | 19 |

Effect of Surface Area on DeNOx Performance

The most effective aluminas set forth in Table 3, namely samples B-1, A-2, C-3, C-4 and A-5, had surface areas that varied from 120 to 380 $m^2/g$, yet had comparable NOx reduction performance. Likewise, the least effective aluminas set forth in Table 3 (from a deNOx perspective) also had surface areas that varied from 130 to 320 $m^2/g$, yet also had comparable NOx reduction performance, albeit, relatively poor NOx reduction performance. Such results tend to suggest that surface area of the alumina alone does not correlate directly with the deNOx performance of alumina. Rather, surface area of the alumina in conjunction with other critical parameters such as impurity content, presence of thermal stabilizers, and average pore size, can be used to characterize effective catalyst materials.

Effect of Pore Volume on DeNOx Performance

Similarly, the mere focus on pore volume of the oxide support material does not, by itself, identify the higher performance catalysts from a deNOx performance perspective. While it is true that oxide support materials, such as aluminas, that demonstrate relatively high deNOx performance generally have pore volumes between about 0.5 and 2.0 cubic centimeters per gram, and more preferably between about 1.0 and 1.5 cubic centimeters per gram, other physical and chemical characteristics of the oxide support materials play an equally important role.

In general, a porous oxide support material has a considerably larger inner surface than outer surface. Thus, the aforementioned catalytic reaction likely proceeds substantially on the inner surface of the oxide support material because the reactants confined in the pores of the oxide support material generally have a greater probability of reacting with active sites of the catalyst material. This may explain why zeolite materials show high catalytic performance especially at high space velocity. Therefore, a large pore volume oxide support material such as selected aluminas and gallium oxide may readily promote the reaction between oxygenated hydrocarbons and NOx.

Effect of Pore Size on DeNOx Performance

Average pore size may have a less significant role in explaining the catalytic performance than pore volume because even the smallest average pore size of the aluminas tested in this study (approximately 3 nm) is much larger than the size of reactants used in the sample gas flows. In addition, even the 3 nm average pore size aluminas are significantly larger than the typical average pore size of zeolite support materials, which ranges between about 0.3 nm to about 1.0 nm.

However, oxide support materials that have both a large average pore size (i.e. greater than about 12 nm diameter) together with large surface area (i.e. greater than 200 $m^2/g$) tend to demonstrate superior deNox performance over oxide support materials with either large average pore size or large surface area, but not both.

For example, the impurity-free alumina, namely the γ-alumina sample B-1, prepared in accordance with the presently disclosed complexing agent assisted sol-gel process and having a relatively large pore volume and large pore size showed better deNOx reduction activity than a similar the impurity-free alumina with relatively smaller pore volume and smaller pore size (Reference γ-alumina, sample A-5). Both γ-aluminas used in the above comparison had similar surface areas.

The same result was observed among stabilized commercial aluminas having similar, but relatively low, surface areas. The Sumitomo TA-2301E commercial alumina, sample C-8, having a surface area of 128 $m^2/g$ and further containing relatively large pore volume and much larger average pore size (28 nm) than other aluminas studied, showed better deNOx reduction activity than the W.R. Grace MI-386, sample C-15, commercial alumina with smaller pore volume and lower average pore size (17 nm). Finally, Sumitomo BK-112, sample C-14, commercial alumina is another example of an alumina that illustrates the importance of pore volume or pore size effect. This commercial alumina showed poor deNOx reduction performance that is likely explained by its' comparatively low pore volume (0.2 cc/g) and/or small pore size (3nm).

DeNOx selectivity of γ-alumina

FIG. 1 shows the NO reduction to $N_2$ over the various alumina samples disclosed in Table 1 above.

The samples were exposed to a stream of 0.1% NO, 0.1% propene, 9% $O_2$, 7% $H_2O$ at 200 cc/min at the indicated temperatures. The Y-axis is the percent conversion of NO to $N_2$ and the X-axis is the stream temperature.

Reference line 21 depicts the NO reduction to $N_2$ performance of the γ-alumina sample prepared by the sol-gel method disclosed herein; reference line 22 depicts the NO reduction to $N_2$ performance of the W.R. Grace MI-200 alumina sample; reference line 23 depicts the NO reduction to $N_2$ performance of the W.R. Grace MI-307HD alumina sample; and reference line 24 depicts the NO reduction to $N_2$ performance of the Sumitomo BK-112L alumina sample. From FIG. 1 it can be seen that the γ-alumina prepared by the presently disclosed sol-gel method shows both a higher maximum NO conversion and a broader temperature window than the commercial aluminas depicted in FIG. 1. In addition, the γ-alumina sample showed higher NO conversion at lower temperatures.

Figure 2:
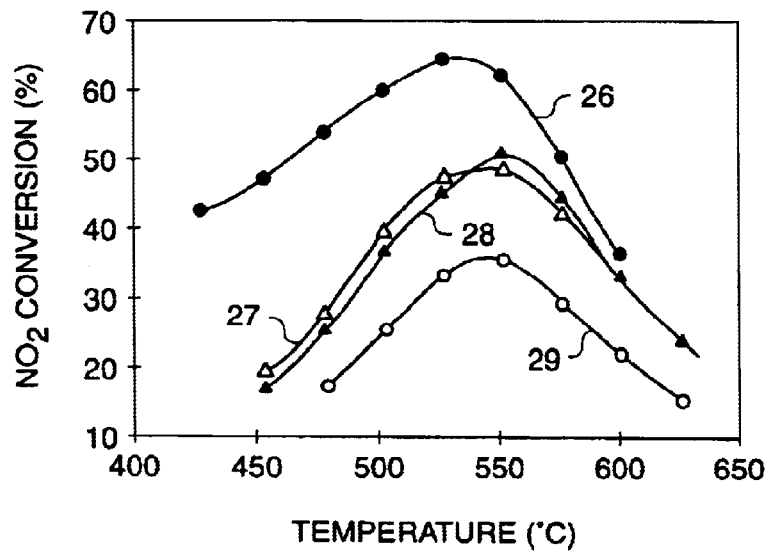
FIG. 2 shows the reduction of $NO_2$ to $N_2$ over various non-aged alumina samples identical to those in FIG. 1.

In FIG. 2, the $NO_2$ reduction to $N_2$ over these same samples is shown. In this case the exposure was the same except that the NO was replaced with 0.1% $NO_2$. As with FIG. 1, the Y-axis of FIG. 2 is the percent conversion of $NO_2$ to $N_2$ and the X-axis is the stream temperature. Reference line 26 depicts the $NO_2$ reduction to $N_2$ performance of the γ-alumina sample prepared by the sol-gel method disclosed herein; reference line 27 depicts the $NO_2$ reduction to $N_2$ performance of the W.R. Grace MI-200 alumina sample; reference line 28 depicts the $NO_2$ reduction to $N_2$ performance of the W.R. Grace MI-307HD alumina sample; and reference line 29 depicts the $NO_2$ reduction to $N_2$ performance of the Sumitomo BK-112L alumina sample. In similarity to the graphs of FIG. 1, it can be seen in FIG. 2 that the γ-alumina prepared by the presently disclosed sol-gel method shows both a higher maximum $NO_2$ conversion and a broader temperature window than the commercial aluminas depicted. In addition, the γ-alumina sample also showed significantly higher $NO_2$ conversion to $N_2$ at much lower temperatures as well as the lowest $T_{max}$ compared to the tested commercial aluminas.

The results shown in FIGS. 1 and 2 indicate that the γ-alumina prepared by the sol-gel method tends to be more selective than commercial aluminas. By the term selective it is meant that the catalyst converts more NOx to $N_2$ using less hydrocarbon. This selectivity makes the sol-gel γ-alumina particularly suitable for use in a lean NOx aftertreatment system.

Aging of the samples involved placing the alumina samples in a tube furnace flowing with 30 ppm $SO_2$, 0.1% propene 7% $H_2O$, 9% $O_2$, 0.10% $NO_2$ at about 520° C. for about 250 hours. FIG. 3 shows the $NO_2$ reduction to $N_2$ over aged alumina samples. The Y-axis of FIG. 3 is the percent conversion of $NO_2$ to $N_2$ and the X-axis is the stream temperature. Reference line 31 depicts the $NO_2$ reduction to $N_2$ performance of the γ-alumina sample prepared by the sol-gel method disclosed herein; reference line 33 depicts the $NO_2$ reduction to $N_2$ performance of the W.R. Grace MI-200 alumina sample; reference line 35 depicts the $NO_2$ reduction to $N_2$ performance of the W.R. Grace MI-307HD alumina sample; reference line 37 depicts the $NO_2$ reduction to $N_2$ performance of the Sumitomo BK-112L alumina sample; and reference line 39 depicts the $NO_2$ reduction to $N_2$ performance of a new sample, W.R. Grace MI-120 commercial alumina. It can be seen in FIG. 3 that the aged γ-alumina prepared by the presently disclosed sol-gel method shows a higher maximum $NO_2$ conversion than the commercial aluminas depicted.

As expected, all alumina samples were significantly deactivated after being subjected to the aging process. However, the sol-gel prepared γ-alumina was more durable than the commercial aluminas for $NO_2$ reduction. For example, the aged γ-alumina still showed a maximum 50% $NO_2$ conversion, while the aged commercial aluminas showed $NO_2$ reduction between 20% and 35% at 500° C. However, the aged γ-alumina exhibited somewhat lower $NO_2$ reduction than the W.R. Grace MI-200 and W.R. Grace MI-120 commercial aluminas in the lower temperature region ($\leq 425°$ C.).

An elemental analysis was performed on W.R. Grace MI-200 and W.R. Grace MI-120 alumina sample revealed that the sample contained 0.2% and 0.3% sulfates (See Table 2). This amount of sulfur impurity likely would have made the alumina surfaces acidic enough to shift the NOx reduction profile towards a lower temperature. The acidic surface may show higher activity at lower temperature than a basic or neutral surface because the acidic surface is better at attracting hydrocarbon reductants, namely propene in this example. These results indicate that the γ-alumina material can be further optimized for operation in a specific temperature window by controlling the acidity of the γ-alumina surface. However, since the acidity of the γ-alumina surface readily activates hydrocarbon oxidation, this could likely result in higher fuel consumption when applied to a lean NOx aftertreatment system. Thus precisely controlling the acidity level in the surface of the γ-alumina catalyst can optimize the temperature window of the catalyst while concurrently managing or controlling the fuel penalty (i.e. hydrocarbon required) for a lean NOx aftertreatment system employing the present catalysts.

Based on the aforementioned analysis, it is preferred that any oxide support material used in a lean NOx aftertreatment system have a pore volume of from 0.5 to approximately 2.0 cubic centimeters per gram, and more preferably 1.0 to 1.5 cubic centimeters per gram, as well as an impurity level and/or thermal stability additive level of less than or equal to 0.2 weight percent. The surface area of the oxide support material used in a lean NOx aftertreatment system can vary, but it is preferable that it be equal to or greater than 200 $m^2$/g. Also the acidity level of the oxide support material can be controlled to optimize the operating temperature window and associated fuel penalty realized by such catalyst. As clearly demonstrated by the examples and data listed above, γ-alumina support material is preferred. The γ-alumina support material can be prepared by any method such as precipitation in addition to the sol-gel method so long as one or more of the above-identified physical characteristics are maintained.

Effect of Metal Doping Methods on Catalyst Performance

Indium or indium oxide doped aluminas were prepared using both a dilution technique as well as an incipient wetness impregnation technique to investigate and understand the active sites of indium oxide and the dependence of indium particle size on overall deNOx performance. The various preparation methods are described in Table 4, each of which yielded a 2.5 weight percent indium or indium oxide loaded, alumina catalyst. Each sample was evaluated for deNOx catalyst performance.

TABLE 4

| Samples | Preparation Methods | Indium Particle Size | Support Material | Indium Source | N2 Yield (%) (at 450° C.) |
|---|---|---|---|---|---|
| In10-Sample A | Dilute In 10 catalyst down to 2.5% In | <10 nm | γ-alumina | 10% In on $Al_2O_3$ | 33 |
| In2.5-Sample B | Incipient wetness impregnation to 2.5% In | <1 nm | γ-alumina | In $Cl_3$ | 61 |
| In2.5-Sample C | Incipient wetness impregnation to 2.5% In | <1 nm | γ-alumina | In $(NO_3)_3$ | 57 |
| In2.5-Sample D | Incipient wetness to achieve 2.5% In | | Commercial Alumina | In $(NO_3)_3$ | 53 |
| In2.0-Sample E | Dilute In 20 catalyst down to 2.5% In | <10 nm | γ-alumina | 20% In on $Al_2O_3$ | 32 |

FIG. 4 shows the NO reduction to $N_2$ over the various 2.5% indium or indium oxide loaded alumina samples disclosed in Table 4 above. The samples were exposed to a stream of 0.1% NO, 0.1% propene, 9% $O_2$, 7% $H_2O$ at 200 cc/min at the indicated temperatures. The Y-axis is the percent conversion of NO to $N_2$ and the X-axis is the stream temperature. Reference line 41 depicts the NO reduction to $N_2$ performance of the In10 Sample A using the γ-alumina support material prepared by the sol-gel method disclosed herein; reference line 43 depicts the NO reduction to $N_2$ performance of In2.5 Sample B using the γ-alumina support material prepared by the sol-gel method disclosed herein; reference line 45 depicts the NO reduction to $N_2$ performance of the In2.5 Sample C using the γ-alumina support material prepared by the sol-gel method disclosed herein;

reference line 47 depicts the NO reduction to $N_2$ performance of the In2.5 Sample D using commercial alumina support material; and reference line 49 depicts the NO reduction to $N_2$ performance of the In20 Sample E using the γ-alumina support material prepared by the sol-gel method disclosed herein.

From FIG. 4 and Table 4, it can be seen that the In2.5 Sample B and In2.5 Sample C catalysts demonstrated a similar deNOx reduction profile, which indicates that the catalyst performance was independent of the choice of chemical precursors, $InCl_3$ and $In(NO_3)_3$, used in the incipient wetness processes. As also illustrated in FIG. 4, both catalysts showed higher NO conversion and broader operation temperature window than those of catalysts prepared using other preparation techniques. In addition, the better performing indium or indium oxide doped alumina catalysts (namely In2.5 Sample B, In2.5 Sample C, and In2.5 Sample D), contained smaller particles of indium species. This suggests that well dispersed indium species are the active phase for the lean-NOx reaction and the deNOx performance is dependent on the particle size of indium oxide.

In light of the above data, it appears that metal doping by an incipient wetness impregnation method yields good deNOx performance at least for indium or indium oxide doped γ-alumina catalysts.

Effect of Metal Promoters on Catalyst performance

Figure 5:
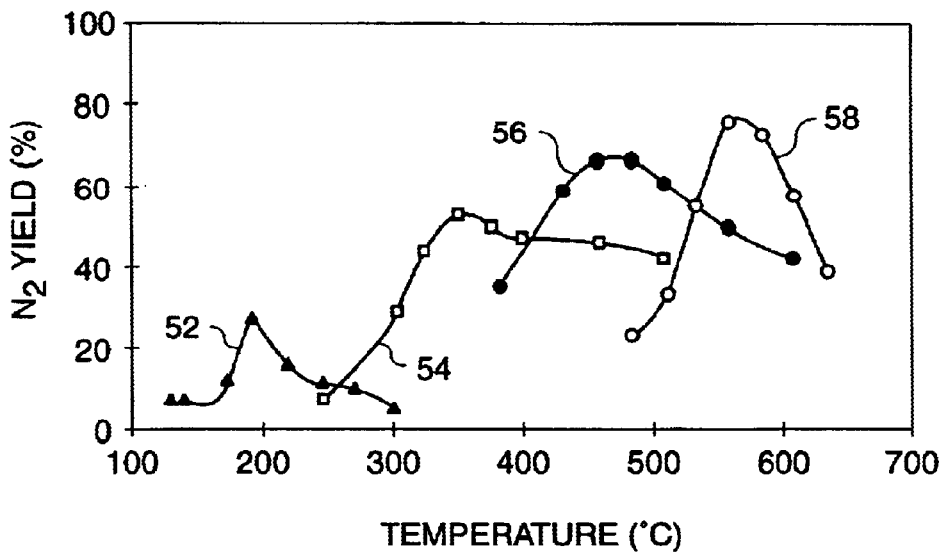
FIG. 5 shows the reduction of NO to $N_2$ over the various catalyst samples.

In FIG. 5 metal-doped γ-alumina samples prepared according to the present invention were compared to other known standard catalysts for their ability to reduce NO to $N_2$. All the samples were exposed to a test gas of 0.1% NO, 0.1% propene, 9% $O_2$, 7% $H_2O$ at 200 cc/min. Reference line 52 shows the activity of a Pt/Fe ceria doped titanium silicalite catalyst. Reference line 54 shows the activity of a standard Cu-ZSM5 catalyst. Reference line 56 shows a γ-alumina sample prepared by the sol-gel method of the present invention and doped with 2.5 weight percent indium or indium oxide. Reference line 58 shows the activity of a γ-alumina sample prepared by the sol-gel method of the present invention doped with about 24 weight percent gallium or gallium oxide. As depicted in FIG. 5, metal doped γ-alumina catalysts prepared in the manner disclosed herein are much more effective in reduction of NO than are either Pt or Cu-ZSM5 catalysts in reducing NO. Also the Pt catalyst produces a substantial amount of $N_2O$, which is a strong greenhouse gas.

Figure 6:
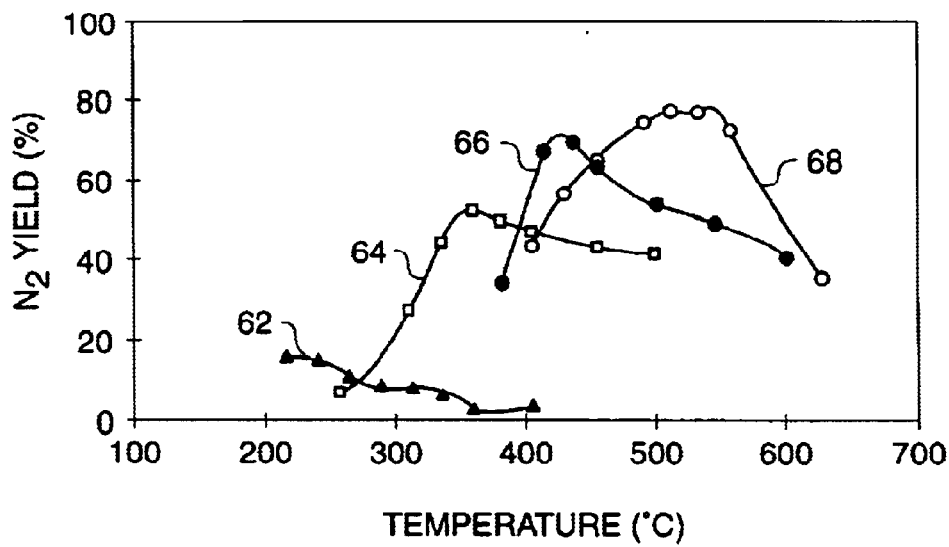
FIG. 6 shows the reduction of $NO_2$ to $N_2$ over the various catalyst samples of FIG. 5.

In FIG. 6 the same samples as in FIG. 5 are shown for their ability to reduce $NO_2$ to $N_2$. Reference lines 62, 64, 66, and 68 are, respectively, the Pt/Fe ceria doped titanium silicalite catalyst, Cu-ZSM5 catalyst, 2.5 weight percent indium or indium oxide doped γ-alumina, and 24 weight percent gallium or gallium oxide doped γ-alumina. All the conditions are the same as for FIG. 5 except that the simulated exhaust gas (i.e. feed gas) includes 0.1% $NO_2$ instead of 0.1% NO. Again, it can be seen that metal-doped γ-alumina catalysts yield more $N_2$ than either Pt or Cu-ZSM5 catalysts.

Effect of Indium on Catalyst Performance

Figure 7:
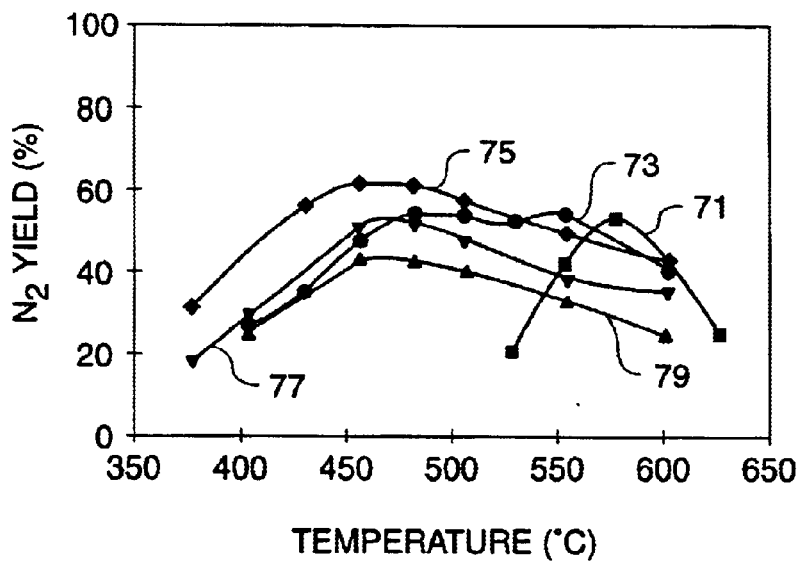
FIG. 7 shows the reduction of NO to $N_2$ over indium or indium oxide doped γ-alumina at various indium levels.
Figure 8:
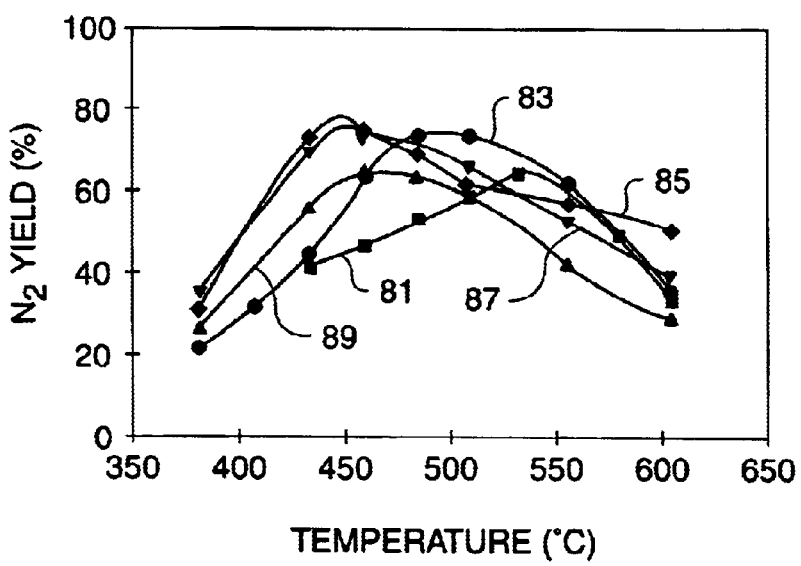
FIG. 8 shows the reduction of $NO_2$ to $N_2$ over the indium or indium oxide doped γ-alumina samples of FIG. 7.

In FIGS. 7 and 8, the deNOx performance of various doping levels of indium or indium oxide onto γ-alumina support material is shown. FIG. 7 depicts the ability of indium or indium oxide doped γ-alumina catalyst samples to reduce NO to $N_2$. The samples were exposed to a stream of 0.1% NO, 0.1% $C_3H_6$, 9% $O_2$, 7% $H_2O$, the balance being He. In FIG. 7, reference number 71 represents a non-doped γ-alumina prepared by the sol-gel method; reference 73 represents a 1 weight percent indium or indium oxide doped γ-alumina catalyst; reference 75 represents a 2.5 weight percent indium or indium oxide doped γ-alumina catalyst; reference number 77 represents a 5 weight percent indium or indium oxide doped γ-alumina; and reference 79 represents a 10 weight percent indium or indium oxide doped γ-alumina catalyst.

Likewise, FIG. 8 depicts the ability of indium or indium oxide doped γ-alumina catalyst samples to reduce $NO_2$ to $N_2$. The samples were exposed to a stream of 0.1% $NO_2$, 0.1% $C_3H_6$, 9% $O_2$, 7% $H_2O$, the balance being He. In FIG. 8, reference number 81 represents the non-metal doped γ-alumina catalyst; reference number 83 represents a 1 weight percent indium or indium oxide doped γ-alumina catalyst; reference line 85 represents a 2.5 weight percent indium or indium oxide doped γ-alumina catalyst; reference 87 represents a 5 weight percent indium or indium oxide doped γ-alumina catalyst; and reference 89 represents a 10 weight percent indium or indium oxide doped γ-alumina catalyst.

It can be seen from FIGS. 7 and 8 that maximal activity was achieved with an indium or indium oxide level of approximately 2.5 weight percent. Furthermore, it can be seen that the indium or indium oxide doped γ-alumina catalyst showed a lower $T_{max}$ and exhibited a broader temperature window than the pure γ-alumina itself.

Figure 9:
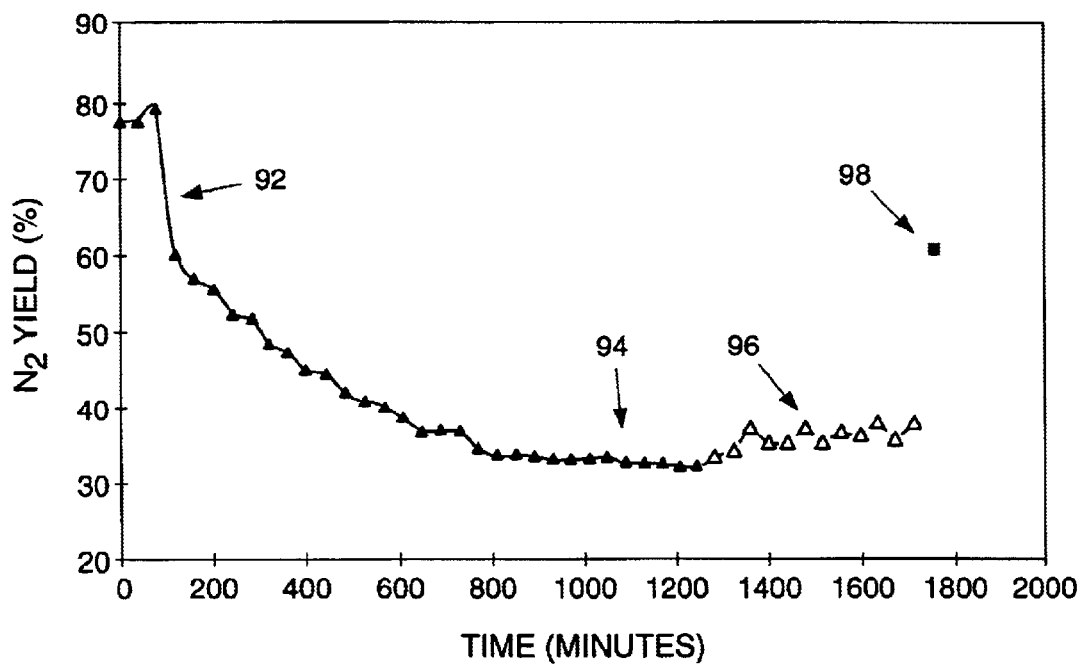
FIG. 9 depicts the sulfur tolerance and recoverability of a 2.5% indium doped γ-alumina sample in the form of reduction of $NO_2$ to $N_2$ over time in the presence of sulfur.

FIG. 9 shows the change in the lean-NOx performance of the indium or indium oxide doped γ-alumina catalyst as a function of time when 30 ppm $SO_2$ was introduced into the reaction gas feed or simulated exhaust gas. After the NOx conversion stabilized in the presence of $SO_2$, the recovery of the NOx conversion was examined by discontinuing $SO_2$ injection in the gas stream and treating catalyst with the simulated exhaust stream free of $SO_2$. As seen in FIG. 9, the $N_2$ yield over 2.5% $In/Al_2O_3$ decreased from 77% to 33% after about 800 minutes when 30 ppm $SO_2$ was introduced into the feed stream (See reference numeral 92). After 800 minutes the activity stabilized (See reference numeral 94) and remained generally stable up to 1250 minutes when the $SO_2$ gas was removed from the simulated exhaust stream. The $N_2$ yield recovered slightly to 37% upon removal of $SO_2$ from the simulated exhaust stream (See reference numeral 96). The indium or indium oxide doped γ-alumina catalyst showed the highest sensitivity to sulfur poisoning compared to tin, silver and gallium doped γ-alumina catalyst, however, after the catalyst was regenerated or treated with a feed stream free of $SO_2$ at 600° C. for about 2 hours the deNOx performance recovered to about 60% (See reference numeral 98). Therefore, $SO_2$ is not a permanent poison for the indium active sites within the γ-alumina. Instead, $SO_2$ is desorbed from catalyst upon regeneration.

Effect of Tin on Catalyst Performance

Figure 10:
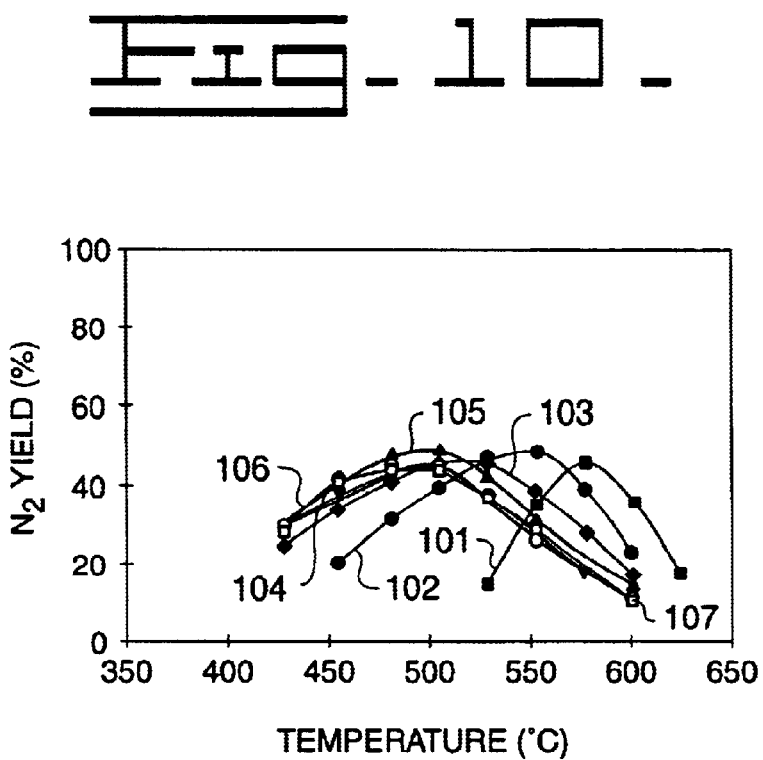
FIG. 10 shows reduction of NO to $N_2$ over tin or tin oxide doped γ-alumina at various tin levels.
Figure 11:
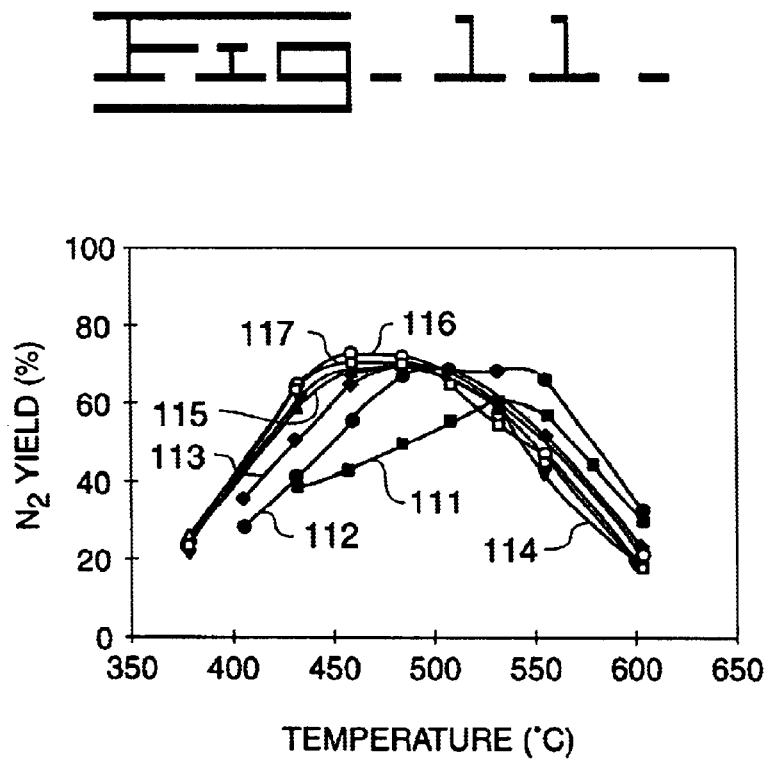
FIG. 11 shows the reduction of $NO_2$ to $N_2$ over the tin or tin oxide doped γ-alumina samples of FIG. 10.

In FIGS. 10 and 11, a similar comparison of the deNOx performance for tin or tin oxide doped γ-alumina catalyst samples having various tin loadings. In FIG. 10, reference lines 101, 102, 103, 104, 105, 106, and 107 represent, respectively, the NO reduction performance of un-doped γ-alumina catalyst; 1 weight percent tin or tin oxide doped γ-alumina catalyst; 2.5 weight percent tin or tin oxide doped γ-alumina catalyst; 5 weight percent tin or tin oxide doped γ-alumina catalyst; 10 weight percent tin or tin oxide doped γ-alumina catalyst; 15 weight percent tin or tin oxide doped γ-alumina catalyst; and 20 weight percent tin or tin oxide doped γ-alumina catalyst. In FIG. 11, reference numbers 111, 112, 113, 114, 115, 116, and 117 represent, respectively, the $NO_2$ reduction performance of un-doped γ-alumina catalyst; 1 weight percent tin or tin oxide doped γ-alumina catalyst; 2.5 weight percent tin or tin oxide doped γ-alumina catalyst; 5 weight percent tin or tin oxide doped γ-alumina catalyst; 10 weight percent tin or tin oxide doped γ-alumina catalyst; 15 weight percent tin or tin oxide doped γ-alumina catalyst; and 20 weight percent tin or tin oxide doped γ-alumina catalyst. The results demonstrate that all of the tin or tin oxide doped γ-alumina catalysts show a lower $T_{max}$ and broader temperature window when compared to un-doped γ-alumina catalysts. The best performing tin or tin oxide doped γ-alumina catalyst was at approximately 10 weight percent.

Figure 12:
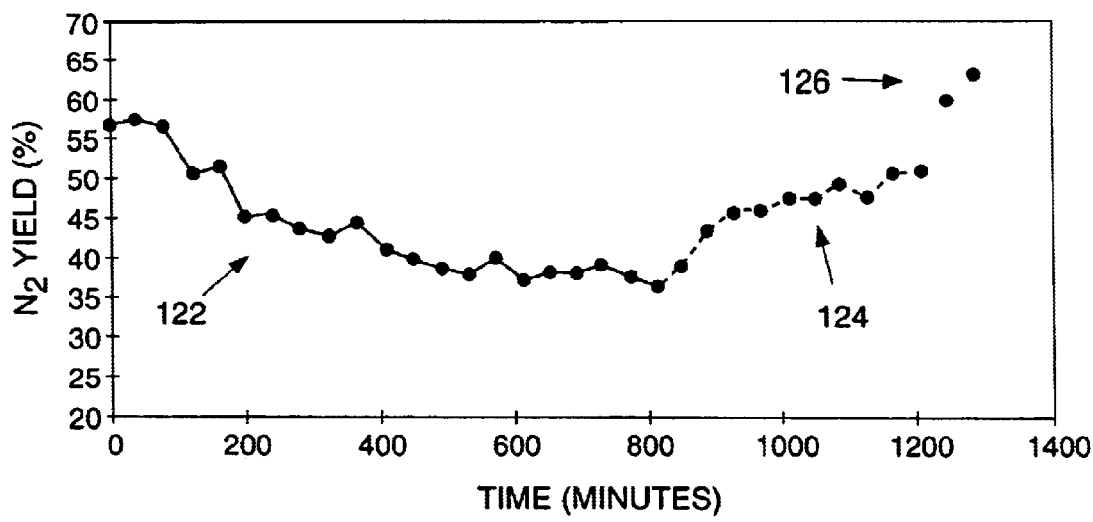
FIG. 12 depicts the sulfur tolerance and recoverability of a 10% tin doped γ-alumina sample in the form of reduction of $NO_2$ to $N_2$ over time in the presence of sulfur.

FIG. 12 shows the change in the lean-NOx performance of the tin or tin oxide doped γ-alumina catalyst as a function of time when 30 ppm $SO_2$ was introduced into the reaction gas feed. After the NOx conversion stabilized in the presence of $SO_2$, the recovery of the NOx conversion was examined by discontinuing $SO_2$ injection in the gas stream and treating catalyst with the simulated exhaust stream free of $SO_2$.

With 30 ppm $SO_2$ the N2 yield over 10% $Sn/Al_2O_3$ (Sn10) decreased from 57% to 38% over 800 minutes (See reference numeral 122). The $NO_2$ reduction activity recovered significantly to about 51% upon the removal of $SO_2$ from the simulated exhaust gas (See reference numeral 124). After the catalyst was regenerated at 600 and 650° C. with $SO_2$ free feed stream, the $NO_2$ reduction recovered to a value that was higher than its original activity, namely ≧60% (See reference numeral 126). Thus, $SO_2$ is not a permanent poison for the tin active sites. Unlike the indium or indium oxide doped alumina catalyst however, tin or tin oxide doped alumina recovered its' $NO_2$ reduction catalytic activity quickly upon removal of $SO_2$ from the feed stream. The quick recovery of the activity may indicate that the $SO_2$ is only weakly adsorbed in the presence of tin species on the alumina surface.

Effect of Gallium on Catalyst Performance

Figure 13:
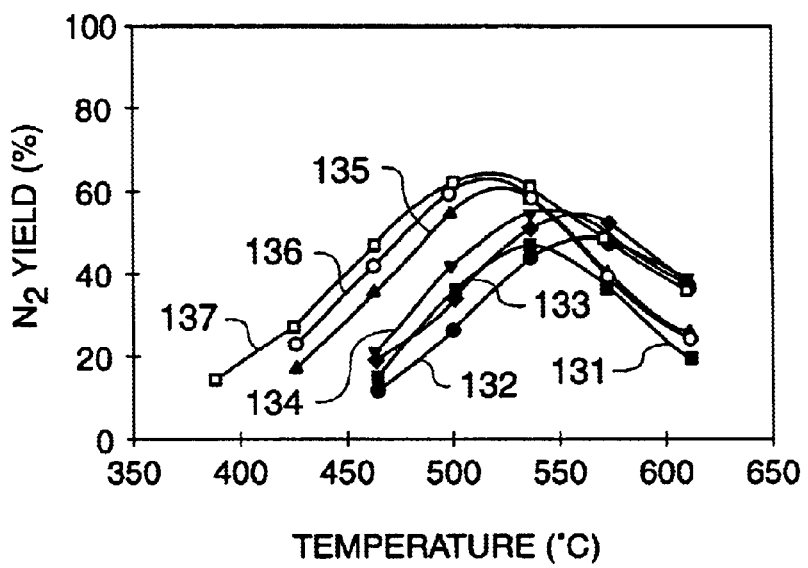
FIG. 13 shows the reduction of NO to $N_2$ over gallium or gallium oxide doped γ-alumina at various gallium levels.
Figure 14:
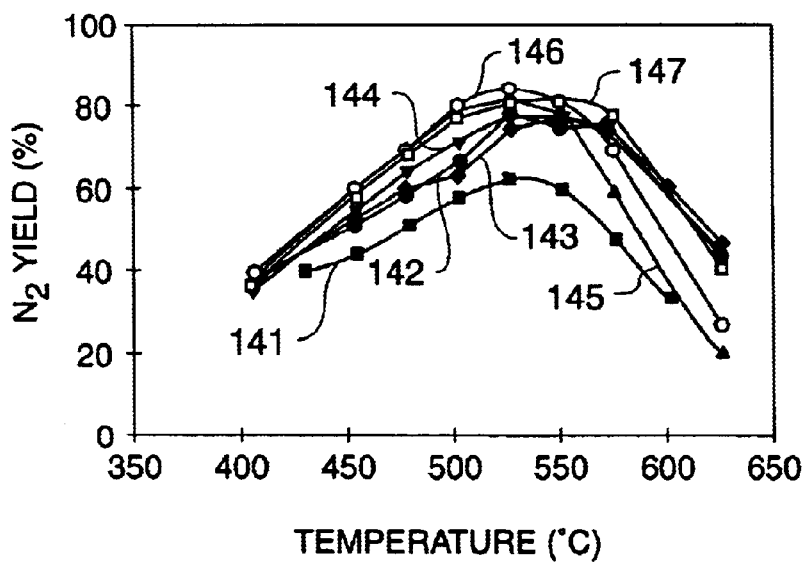
FIG. 14 shows the reduction of $NO_2$ to $N_2$ over the gallium or gallium oxide doped γ-alumina samples of FIG. 13.

In FIGS. 13 and 14, a similar comparison was done for gallium or gallium oxide doped γ-alumina catalyst prepared according to the present invention.

FIG. 13 represents the reduction of NO to $N_2$ while FIG. 14 represents the reduction of $NO_2$ to $N_2$. In FIG. 13, reference numbers 131–137 represent, respectively, non-metal doped γ-alumina catalyst; 1 weight percent gallium or gallium oxide doped γ-alumina catalyst; 2.5 weight percent gallium or gallium oxide doped γ-alumina catalyst; 6 weight percent gallium or gallium oxide doped γ-alumina catalyst; 10 weight percent gallium or gallium oxide doped γ-alumina catalyst; 20 weight percent gallium or gallium oxide doped γ-alumina catalyst; and 24 weight percent gallium or gallium oxide doped γ-alumina catalyst. In FIG. 14 reference numbers 141–147 represent, respectively, non-metal doped γ-alumina catalyst; 1 weight percent gallium or gallium oxide doped γ-alumina catalyst; 2.5 weight percent gallium or gallium oxide doped γ-alumina catalyst; 6 weight percent gallium or gallium oxide doped γ-alumina catalyst; 10 weight percent gallium or gallium oxide doped γ-alumina catalyst; 20 weight percent gallium or gallium oxide doped γ-alumina catalyst; and 24 weight percent gallium doped γ-alumina catalyst. In addition to the samples shown in FIGS. 13 and 14, a 50 weight percent gallium or gallium oxide doped γ-alumina catalyst sample has been prepared. The 50 weight percent gallium or gallium oxide doped γ-alumina catalyst shows the highest activity for NO or $NO_2$ reduction. As with the indium or indium oxide doped and tin or tin oxide doped γ-alumina catalyst samples, all of the gallium or gallium oxide doped γ-alumina catalysts show better NOx reduction activity than the un-doped γ-alumina catalyst and show a wider temperature window.

Figure 15:
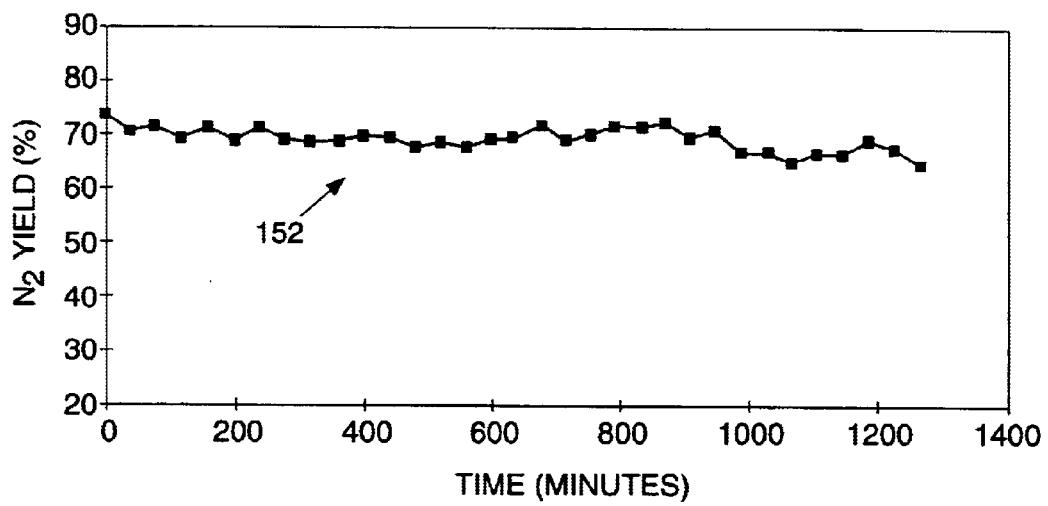
FIG. 15 depicts the sulfur tolerance of a 50% gallium or gallium oxide doped γ-alumina sample in the form of reduction of $NO_2$ to $N_2$ over time in the presence of sulfur.

FIG. 15 shows the change in the lean-NOx performance of the 50 percent gallium or gallium oxide doped γ-alumina catalyst as a function of time when 30 ppm $SO_2$ was introduced into the simulated exhaust gas feed. The gallium or gallium oxide doped alumina catalyst sample showed the highest resistance to $SO_2$ poisoning among the metal-doped catalysts evaluated. As seen in FIG. 15, the addition of 30 ppm $SO_2$ in the simulated exhaust gas did not significantly suppress the $NO_2$ reduction activity. In fact, the $N_2$ yield only slightly decreased from 72% to 67% even after 20 hours in the presence of $SO_2$ (See reference numeral 152). A 50 weight percent gallium or gallium oxide loading is more than enough to cover the entire γ-alumina surface. Therefore, the sulfur tolerance of 50% $Ga/Al_2O_3$ catalyst can be attributed to the insensitivity of gallium species to $SO_2$.

In addition to the metal promoters that have been disclosed above for doping of the γ-alumina, other metals that could be utilized include silver, germanium, gold, nickel, cobalt, copper, iron, manganese, molybdenum, chromium, cerium, vanadium, oxides thereof, and combinations thereof. As discussed hereinabove, the γ-alumina preferably has a pore volume of from about 0.5 to about 2.0 cubic centimeters per gram; a surface area of between 80 and 350 meters squared per gram and more preferably greater than or equal to 200 meters squared per gram; an average pore size diameter of between 8 and 30 nanometers; and an impurity level of less than or equal to 0.2 weight percent. In a preferred embodiment the γ-alumina is prepared by a sol-gel method, with the metal or metal oxide doping of the γ-alumina preferably accomplished using an incipient wetness impregnation technique.

Industrial Applicability

Figure 16:
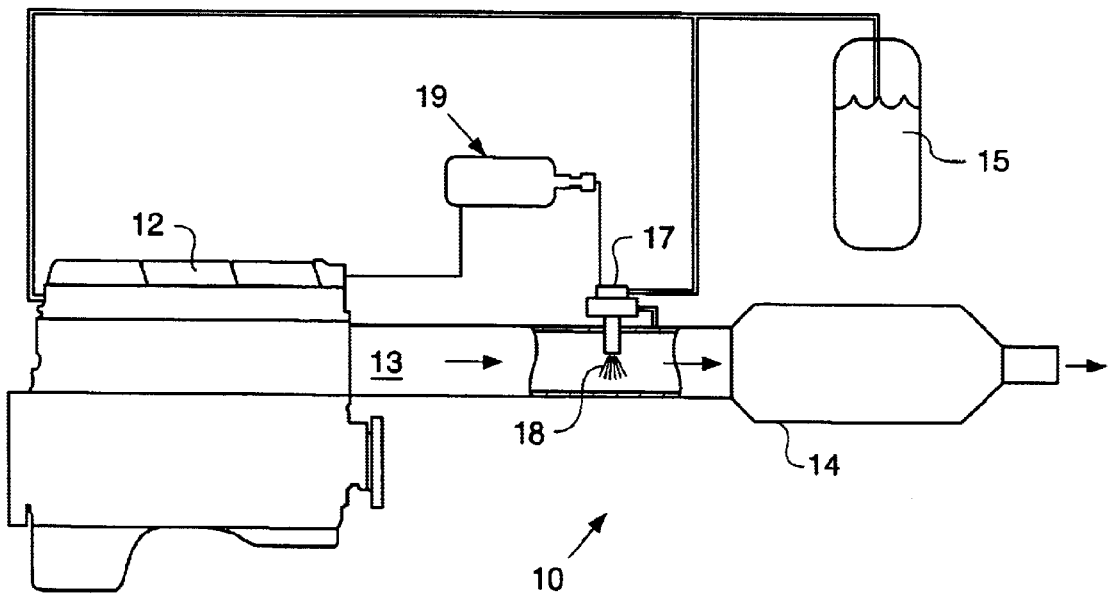
FIG. 16 is a schematic diagram of a lean NOx aftertreatment system adapted for use in a diesel engine.

It is envisioned that the catalyst disclosed herein is best suited for use in a lean NOx exhaust aftertreatment system. FIG. 16 provides a schematic diagram of a lean NOx aftertreatment system 10 coupled to a "lean burn" engine 12, shown in FIG. 16 as a diesel engine. Throughout the specification and the claims, however, a lean burn engine is defined as one that produces an oxygen rich exhaust, which is defined as an exhaust having a higher molar ratio of oxygen than the total molar ratio of reductive compounds such as CO, hydrogen and hydrocarbons. The exhausts have an oxidative environment. Examples of such engine systems include diesel engine systems; spark ignited natural gas or alternative fuel engine systems; liquid or gaseous fueled turbine engines; and various lean burn gasoline engine systems. Generally, diesel engine systems, as shown in FIG. 16 generate an exhaust having an oxygen content of from 4% to 16% depending on the load conditions and the running mode of the diesel engine.

An oxygen rich exhaust 13 exits engine 12 and is directed to the lean NOx aftertreatment system 10. Preferably, this exhaust is supplemented by the addition of an atomized hydrocarbon or mixture of hydrocarbons 18. In the illustrated embodiment, one source of these hydrocarbons can be the diesel fuel 15 used as the primary source of fuel for the diesel engine combustion. In fact, the needed hydrocarbons can be the residual hydrocarbons remaining in the exhaust after the combustion event during an engine cycle. Alternatively, the supplemental hydrocarbons can be introduced as a post injection event, preferably during the power stroke or exhaust stoke of a four stroke diesel engine. Yet another alternative, as illustrated, is to introduce the supplemental hydrocarbon in the exhaust system or aftertreatment system at a location downstream of the engine cylinders using an auxiliary injector 17 controlled by the engine control module (ECM) 19. It is also well known to use hydrocarbons other than the primary diesel fuel.

The engine exhaust is directed to a catalytic unit 14. Deposited within the catalytic unit is a metal doped oxide catalyst having the customized physical and chemical characteristics, disclosed herein that yield both high deNOx performance as well as other advantageous lean NOx catalyst performance characteristics. The composition of this metal doped oxide catalyst as well as the catalytic reactions are described more fully below.

From the foregoing, it can be seen that the disclosed embodiments provide a metal-doped oxide catalyst for lean NOx aftertreatment system and method for preparing the same. While the embodiments herein disclosed has been described by means of specific materials and methods or processes associated therewith, numerous changes, modifications, and variations could be made thereto by those skilled in the art without departing from the scope of the invention as set forth in the claims.

What is claimed is:

1. A method for making a lean NOx catalyst comprising the steps of:

preparing a substrate;

preparing a γ-alumina catalyst support material using a sol-gel process thereby controlling the γ-alumina support material physical properties selected from the group consisting of average pore size, pore volume, surface area, acidity, and impurity level;

doping metal or metal oxide promoters into the γ-alumina support material; and applying the metal or metal oxide doped γ-alumina support material to the substrate to achieve a uniform catalyst coating on said substrate.

2. The method of claim 1 wherein the step of preparing the γ-alumina catalyst support material using the sol-gel process is prepared using a sol-gel method assisted with a complexing agent.

3. The method of claim 2 wherein the step of preparing the γ-alumina catalyst support material further comprises the steps of:

dissolving an aluminum based precursor in the complexing agent to form an aluminum based solution;

gelating the aluminum based solution at prescribed temperatures to yield aluminum hydroxide;

washing the aluminum hydroxide with water or an organic solvent;

dehydrating the aluminum hydroxide; and calcinating the aluminum hydroxide to form the γ-alumina catalyst support material.

4. The method of claim 3 wherein the step of doping metal or metal oxide promoters into the γ-alumina catalyst support material further comprises doping the γ-alumina with indium or indium oxide having particle sizes less than about 1 nm.

5. The method of claim 1 wherein the complexing agent is 2-methyl-2,4-pentanediol (MPD).

6. The method of claim 1 wherein the step of doping metal or metal oxide promoters into the γ-alumina support material further comprises introducing the metal or metal oxide promoters using a dilution technique during the sol gel process.

7. The method of claim 1 wherein the step of doping metal or metal oxide promoters into the γ-alumina support material further comprises introducing the metal or metal oxide promoters using an incipient wetness impregnation technique.

8. The method of claim 1 wherein the step of preparing the γ-alumina catalyst support material using a sol-gel process further includes the step of controlling the acidity of the γ-alumina.

9. The method of claim 1 wherein the step of doping metal or metal oxide promoters into the γ-alumina catalyst support material further comprises doping the γ-alumina with between about 1 weight percent to about 10 weight percent indium or indium oxide.

10. The method of claim 1 wherein the step of doping metal or metal oxide promoters into the γ-alumina catalyst support material further comprises doping the γ-alumina with between about 1 weight percent to about 20 weight percent tin or tin oxide.

11. The method of claim 1 wherein the step of doping metal or metal oxide promoters into the γ-alumina catalyst support material further comprises doping the γ-alumina with gallium or gallium oxide in the amount of 20 weight percent or greater.

12. The method of claim 1 wherein the step of doping metal or metal oxide promoters into the γ-alumina catalyst support material further comprises doping the γ-alumina with a combination of metal promoters including gallium or gallium oxide.

13. The method of claim 1 wherein the step of doping metal or metal oxide promoters into the γ-alumina catalyst support material further comprises doping the γ-alumina with a combination of metal promoters including tin or tin oxide.

14. The method of claim 1 wherein the step of preparing the γ-alumina catalyst support material using a sol-gel process controls the γ-alumina catalyst support material pore volume to between about 0.5 cc/g and about 2.0 cc/g.

15. The method of claim 1 wherein the step of preparing γ-alumina catalyst support material using a sol-gel process controls the γ-alumina catalyst support material impurity level to an amount of about 0.2 weight percent or less.

16. The method of claim 1 wherein the step of preparing γ-alumina catalyst support material using a sol-gel process controls the γ-alumina catalyst support material surface area to between about 80 g/m$^2$ to 350 g/m$^2$ and controls the γ-alumina catalyst support material average pore size to between about 3 nm to about 30 nm.

17. The method of claim 16 wherein the step of preparing γ-alumina catalyst support material using a sol-gel process controls the γ-alumina catalyst support material surface area to about 200 g/m$^2$ or greater.

18. The method of claim 16 wherein the step of preparing γ-alumina catalyst support material using a sol-gel process controls the γ-alumina catalyst support material average pore size to about 10 nm or greater.

19. A method for making a γ-alumina lean NOx catalyst comprising the steps of:

dissolving an aluminum based precursor in a complexing agent to form an aluminum based solution;

gelating the aluminum based solution at prescribed temperatures to yield aluminum hydroxide;

washing the aluminum hydroxide with water or an organic solvent;

aging the aluminum hydroxide;

drying the aluminum hydroxide;

calcining the aluminum hydroxide to form γ-alumina catalyst support material;

doping metal or metal oxide promoters selected from the group consisting of indium, gallium, tin, silver, germanium, gold, nickel, cobalt, copper, iron, manganese, molybdenum, chromium, cerium, vanadium, oxides thereof, and combinations thereof into the γ-alumina catalyst support material; and applying the metal or metal oxide doped γ-alumina catalyst support material to a substrate to achieve a uniform catalyst coating on said substrate.

20. The method of claim 19 wherein the complexing agent is 2-methyl-2,4-pentanediol (MPD).

21. The method of claim 19 wherein the step of doping metal or metal oxide promoters into the γ-alumina support material further comprises introducing the metal or metal oxide promoters using a dilution technique.

22. The method of claim 19 wherein the step of doping metal or metal oxide promoters into the γ-alumina support material further comprises introducing the metal or metal oxide promoters using an incipient wetness impregnation technique.

23. The method of claim 19 further comprising the step of controlling the acidity of the γ-alumina during the sol-gel process.

24. The method of claim 19 wherein the step of doping metal or metal oxide promoters into the γ-alumina catalyst support material further comprises doping the γ-alumina with between about 1 weight percent to about 10 weight percent indium or indium oxide.

25. The method of claim 24 wherein the step of doping metal or metal oxide promoters into the γ-alumina catalyst support material further comprises doping the γ-alumina with indium or indium oxide having particle sizes less that about 1 nm.

26. The method of claim 19 wherein the step of doping metal or metal oxide promoters into the γ-alumina catalyst support material further comprises doping the γ-alumina with between about 1 weight percent to about 20 weight percent tin or tin oxide.

27. The method of claim 19 wherein the step of doping metal or metal oxide promoters into the γ-alumina catalyst support material further comprises doping the γ-alumina with gallium or gallium oxide in the amount of 20 weight percent or greater.

28. The method of claim 19 wherein the step of doping metal or metal oxide promoters into the γ-alumina catalyst support material further comprises doping the γ-alumina with a combination of metal or metal oxide promoters including gallium or gallium oxide to increase the sulfur tolerance of the γ-alumina catalyst support material.

29. The method of claim 19 further comprising the step controlling the γ-alumina support material physical properties selected from the group consisting of average pore size, pore volume, surface area, acidity, and impurity level during one or more of the washing, aging, drying and calcination steps.

* * * * *